_United States Patent_ [19]

Helbing

[11] 4,392,900

[45] Jul. 12, 1983

[54] METHOD AND APPARATUS FOR APPLYING A PATCH

[76] Inventor: Clarence H. Helbing, 485 Tailholt La., Shelbyville, Ind. 46176

[21] Appl. No.: 341,489

[22] Filed: Jan. 21, 1982

[51] Int. Cl.$^3$ .............................................. B32B 31/12
[52] U.S. Cl. ..................................... 156/153; 156/314; 156/319; 156/330.9; 156/645; 156/668; 428/409; 428/520
[58] Field of Search ............ 156/153, 314, 319, 330.9, 156/668, 645; 260/464.5; 428/409, 520; 526/297, 298

[56] References Cited

U.S. PATENT DOCUMENTS

| | | | |
|---|---|---|---|
| 1,371,501 | 3/1921 | McLane | 152/DIG. 12 X |
| 1,544,262 | 6/1925 | Midgley | 152/330 R X |
| 2,625,496 | 1/1953 | Swift et al. | 428/40 X |
| 2,794,788 | 6/1957 | Coover et al. | 156/295 X |
| 2,985,216 | 5/1961 | Williams et al. | 152/330 R |
| 3,193,424 | 7/1965 | Scott | 156/153 X |
| 3,225,810 | 12/1965 | Enabnit | 152/330 R |
| 3,233,647 | 2/1966 | Newell | 152/330 R |
| 3,317,330 | 5/1967 | Livingston et al. | 156/668 X |
| 3,449,201 | 6/1969 | Palmquist et al. | 152/353 R X |
| 3,619,245 | 11/1971 | Maekawa | 156/668 X |
| 4,125,655 | 11/1978 | Kanzelberger | 428/173 X |
| 4,182,393 | 1/1980 | Larson et al. | 156/116 X |
| 4,256,159 | 3/1981 | Williams | 152/353 R |

_Primary Examiner_—Robert A. Dawson
_Attorney, Agent, or Firm_—Woodard, Weikart, Emhardt & Naughton

[57] ABSTRACT

A method for applying an elastomeric patch to a polypropylene or polyethylene battery case including the steps of cleaning the surface area with a solvent, applying hydrogen peroxide to an abrasive material, such as emery cloth, abrading away the surface layer, and applying the patch to the prepared surface by means of a cyanoacrylate adhesive.

10 Claims, No Drawings

METHOD AND APPARATUS FOR APPLYING A PATCH

BACKGROUND OF THE INVENTION

1. Field of the Invention

The present invention relates primarily to a method and apparatus for applying an identifying marking on articles such as polypropylene battery cases, and in particular to a method for applying a rubber patch to such devices.

2. Description of the Prior Art

It is often desirable to provide markings for batteries or battery cases to discourage unauthorized replacement or transfer thereof, particularly in respect to commercial operation of vehicles. Automobile rental agencies, for example, have particular need for permanently providing each battery on their automobiles which are leased with identification marking. This is true in particular because of the possibility of unauthorized interchange or substitution while the automobiles are beyond the agency's control for an extended period. In addition, public service commissions in many states require that trucking companies apply a variety of identifying indicia to trucks and trailers operating across particular states. These requirements make additionally desirable an inexpensive, convenient means of applying such markings.

Batteries may be provided with a serial number, usually having many digits, and typically of quite small dimension. These numbers are difficult to read, and may be positioned in a manner that makes the numbers inaccessible for viewing. The present invention provides a method and apparatus for applying identifying markings to articles such as batteries, and which provides an attractive and easily read marking. In U.S. Pat. No. 2,985,216, issued on May 23, 1961 to Williams, there is disclosed a method and apparatus for applying markings to vehicle tires. In accordance with that patent, a tire applique was provided which comprised a pad of rubber laminations of contrasting color. Identifying perforations were die cut into the pad laminations to provide the markings. An improved method and apparatus for marking tires is disclosed in U.S. Pat. No. 4,256,159, also issued to Williams on Mar. 17, 1981.

In U.S. Pat. No. 1,544,262, issued to Midgley on June 30, 1925, there is disclosed a method for marking rubber. Under the Medgley procedure, tires are formed with stocks of contrasting shades. Heat is applied to the tire to react upon the rubber mixture to produce a change of shade at this location. Coating devices formed with tires are disclosed in U.S. Pat. Nos. 3,225,810, issued to Enabnit on Dec. 28, 1965, and 3,233,647, issued to Newell on Feb. 8, 1966.

A variety of other marking materials or methods are shown in the prior art. A pneumatic rubber tire with adherent polyurethane sidewall is disclosed in U.S. Pat. No. 4,182,393, issued to Larson et al. on Jan. 8, 1980. A tire sidewall facing is also described in U.S. Pat. No. 3,449,201, issued to Palmquist et al. on June 10, 1969. A method and means for applying legends or designs to tires is described in U.S. Pat. No. 1,371,501, issued to McLane on Mar. 15, 1921. Decorative plaques and transfers are described in U.S. Pat. Nos. 4,125,655, issued to Kanzelberger on Nov. 14, 1978, and 2,625,496, issued to Swift et al. on Jan. 13, 1953.

SUMMARY OF THE INVENTION

In a preferred embodiment, the present invention comprises a method including the steps of abrading a polypropylene surface down to an underlying surface, applying hydrogen peroxide followed by a layer of cyanoacrylate adhesive to the exposed, underlying surface and positioning a patch over the adhesive.

It is an object of the present invention to provide an identification marking for articles such as battery cases, which marking is inexpensive and easily applied and becomes a permanent part of the object.

Another object of the present invention is to provide a simple, effective and non-hazardous method to apply a patch comprising identifying material or other indicia.

Further objects and advantages of the present invention will become apparent from the description of the preferred embodiment which follows.

DESCRIPTION OF THE PREFERRED EMBODIMENT

For the purposes of promoting an understanding of the principles of the invention, reference will now be made to the preferred embodiment and specific language will be used to describe the same. It will nevertheless be understood that no limitation of the scope of the invention is thereby intended, such alterations and further modifications, and such further applications of the principles of the invention being contemplated as would normally occur to one skilled in the art to which the invention relates.

The present invention provides a method for applying a patch on a battery case or the like. The battery case comprises a polypropylene or polyethylene surface area, which are the customary and preferred materials for such cases. As used herein, the term battery case refers to the actual casing or housing for the battery, but is also intended to encompass similar type automotive objects of a polyethylene or polypropylene material, or having a surface area of those materials. The present method comprises the step of abrading the polypropylene or polyethylene surface area sufficiently to remove a surface layer and expose the underlying surface. This step is performed to expose the underlying surface area which may be referred to as a surface of virgin material which is not normally exposed and typically is not oxidized to the level that the original surface would be. Prior to abrading the surface it is preferable to clean the initial surface area with a suitable solvent to remove dirt, oil, grease and other such materials. The abrading of the polypropylene or polyethylene surface area to remove the suface layer is preferably accomplished by use of an abrasive such as emery cloth.

An additional step of the present method is the application of hydrogen peroxide to the surface of the battery case or the like to which the patch is to be applied. A 3 percent solution of hydrogen peroxide is typically suitable and is preferred in this method. In broad terms, this comprises the application of hydrogen peroxide to the exposed, underlying surface. In a preferred method, the abrasion step is combined with the application step by means of applying the hydrogen peroxide to the abrasive material and then abrading the surface area with the abrasive material. Again, these steps are preferably accomplished by applying the hydrogen peroxide to an emery cloth which is then used to abrade away the original surface layer of the polypropylene or polyethylene surface area. it has been found that a fine grade of emery cloth may be used, such as that which is available from the 3M Company, and more particularly it is preferred to use emery cloth having the designation of carborundum medium J135R or extra coarse J135R emery cloth.

A thin layer of a suitable adhesive is then applied to the prepared surface. In accordance with the present invention, the adhesive comprises a cyanoacrylate adhesive. A suitable adhesive, for example, is one available commercially under the trademark DURO SUPER GLUE, from Wood Hill Permatex, a Loctite subsidiary of Cleveland, Ohio 441281.

With the surface area thus prepared, the patch or other indicia is applied to the surface, preferably with pressure. It is an aspect of the present invention that a method is provided for securing an elastomeric patch to a polypropylene or polyethylene surface. The patch or the like may have a variety of materials, layers or surfaces, but it is an element of the present invention that the mounting surface for the patch be an elastomeric material. For example, the mounting surface may comprise a vulcanizable rubber latex coating, most preferably an uncured, cushioned gum rubber. Such patches are typically available with a removable covering, such as a Holland cloth, which is removed prior to mounting the patch onto the prepared surface. Suitable patches would include those described in the cited prior art having an elastomeric backing, and particularly those such as described in the Williams et al. U.S. Pat. No. 4,256,159, issued Mar. 17, 1981.

The method thus described provides a suitable means for applying an elastomeric patch onto a battery case or the like comprising a polypropylene or polyethylene surface area. This method is readily performed and provides a secure attachment of the patch to the surface. In contrast, prior art literature suggests generally severe preparation of a polypropylene surface, such as an acid treatment. It has also been found that attempts to mount a patch without the described method may be unsuccessful. In particular, the attempt to merely attach a patch to a polypropylene or polyethylene surface of a battery case by means of an epoxy adhesive, an acrylic latex adhesive or a silicon rubber adhesive have been found to be unsuccessful absent the additional preparation steps described herein.

While the invention has been described in detail in the foregoing description, the same is to be considered as descriptive and not restrictive in character, it being understood that only the preferred embodiment has been described and that all changes and modifications that come within the spirit of the invention are desired to be protected.

What is claimed is:

1. A method for applying a patch having an elastomeric mounting surface on a battery case or the like, the battery case comprising a polypropylene surface area, the method comprising the steps of:
   a. abrading the polypropylene surface area of the battery case sufficiently to remove a surface layer and expose the underlying surface of the battery case;
   b. applying hydrogen peroxide to the exposed, underlying surface of the battery case;
   c. after step b., applying a layer of cyanoacrylate adhesive to the exposed, underlying surface of the battery case; and
   d. positioning the patch with the elastomeric mounting surface against the adhesive.

2. The method of claim 1 in which steps a. and b. comprise applying hydrogen peroxide to an abrasive material and abrading the polypropylene surface area with the abrasive material.

3. The method of claim 2 in which the abrasive material is emery cloth.

4. The method of claim 1 and which prior to step a. includes the step of cleaning the polypropylene surface area with a suitable solvent.

5. The method of claim 4 in which steps a. and b. comprise applying hydrogen peroxide to an abrasive material and abrading the polypropylene surface area with the abrasive material.

6. The method of claim 5 in which the abrasive material is emery cloth.

7. A method for applying a patch having an elastomeric mounting surface on a battery case or the like, the battery case comprising a polyethylene surface area, the method comprising the steps of:
   a. abrading the polyethylene surface area of the battery case sufficiently to remove a surface layer and expose the underlying surface of the battery case;
   b. applying hydrogen peroxide to the exposed, underlying surface of the battery case;
   c. after step b., applying a layer of cyanoacrylate adhesive to the exposed, underlying surface of the battery case; and
   d. positioning the patch with the elastomeric mounting surface against the adhesive.

8. The method of claim 7 in which steps a. and b. comprise applying hydrogen peroxide to an abrasive material and abrading the polypropylene surface area with the abrasive material.

9. The method of claim 8 in which the abrasive material is emery cloth.

10. The method of claim 9 and which prior to step a. includes the step of cleaning the polypropylene surface area with a suitable solvent.

* * * * *